US009698538B2

(12) United States Patent
Sechrist

(10) Patent No.: US 9,698,538 B2
(45) Date of Patent: Jul. 4, 2017

(54) RIBBON ASSEMBLY AND A COMMUNICATION SYSTEM HAVING A PLURALITY OF RIBBON ASSEMBLIES

(71) Applicant: Tyco Electronics Corporation, Berwyn, PA (US)

(72) Inventor: Joshua Tyler Sechrist, Etters, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 106 days.

(21) Appl. No.: 14/635,079

(22) Filed: Mar. 2, 2015

(65) Prior Publication Data

US 2016/0261060 A1    Sep. 8, 2016

(51) Int. Cl.
| H05K 7/00 | (2006.01) |
| H01R 13/6585 | (2011.01) |
| H04Q 1/06 | (2006.01) |
| H01R 13/6461 | (2011.01) |

(52) U.S. Cl.
CPC ........... H01R 13/6585 (2013.01); H04Q 1/06 (2013.01); *H01R 13/6461* (2013.01)

(58) Field of Classification Search
CPC ........ H02G 15/22; H02G 15/20; H02G 15/02; H02G 15/06; H02G 3/0431; H02G 3/08; H02G 3/10; H02G 3/081; H02G 3/14; H02G 15/08; H02G 3/0437; H02G 3/0608; H01B 9/06; H01B 11/002; H01B 7/0807; H01B 7/00; H01H 9/02; H05K 5/00; B60R 16/0239; B60R 16/0207; H01R 13/6585; H01R 13/6461; H04Q 1/06

See application file for complete search history.

(56) References Cited

U.S. PATENT DOCUMENTS

| 5,333,097 | A | * | 7/1994 | Christensen | ......... | G11B 33/126 |
| | | | | | | 361/679.35 |
| 5,864,465 | A | * | 1/1999 | Liu | .......................... | G06F 1/206 |
| | | | | | | 174/16.3 |
| 6,194,664 | B1 | * | 2/2001 | Zamora | .................. | H02G 11/00 |
| | | | | | | 174/117 F |
| 6,238,235 | B1 | | 5/2001 | Shavit et al. | | |
| 6,353,697 | B1 | * | 3/2002 | Daoud | ................. | G02B 6/4454 |
| | | | | | | 385/135 |
| 7,374,450 | B1 | | 5/2008 | Chang | | |

(Continued)

FOREIGN PATENT DOCUMENTS

WO    WO2014105585 A1    7/2014

*Primary Examiner* — Pete Lee

(57) ABSTRACT

Ribbon assembly includes first and second contact modules that each include signal and ground contacts that are configured to engage electrical contacts of a corresponding mating connector. The ribbon assembly also including a plurality of cables that are coupled to and extend between the first and second contact modules. The cables electrically couple the signal and ground contacts of the first contact module to the signal and ground contacts, respectively, of the second contact module. The cables extend parallel to one another and are coplanar at the first contact module and at the second contact module. The ribbon assembly also includes a cable organizer that is coupled to the plurality of cables at a location between and separate from the first and second contact modules. The cables extend parallel to one another and are coplanar as the cables extend through the cable organizer.

20 Claims, 8 Drawing Sheets

(56) References Cited

U.S. PATENT DOCUMENTS

| | | | |
|---|---|---|---|
| 7,404,736 B2 * | 7/2008 | Herbst | H04Q 1/13 |
| | | | 439/557 |
| 8,277,245 B2 * | 10/2012 | Fix | H02G 3/32 |
| | | | 439/497 |
| 9,123,452 B2 * | 9/2015 | Sugiyama | H01B 7/0823 |
| 2009/0061695 A1 | 3/2009 | Ko et al. | |
| 2010/0015826 A1 * | 1/2010 | Daily | H01R 13/504 |
| | | | 439/147 |
| 2012/0122335 A1 * | 5/2012 | Costello | H04Q 1/025 |
| | | | 439/502 |

* cited by examiner

RIBBON ASSEMBLY AND A COMMUNICATION SYSTEM HAVING A PLURALITY OF RIBBON ASSEMBLIES

BACKGROUND

The subject matter herein relates generally to communication systems, such as a cable backplane system or a cable midplane system, and mechanisms for routing cables that interconnect electrical connectors of the communication systems.

Various communication systems may include an array of electrical connectors for interconnecting different communication devices. For example, cable backplane or midplane systems, such as network systems, servers, data centers, and the like, utilize at least one array of electrical connectors to interconnect daughter card assemblies. The daughter card assemblies may be referred to as line cards or switch cards. The electrical connectors have front ends that engage corresponding mating connectors of the daughter card assemblies. The electrical connectors also have back ends that are coupled to cables. The cables extend between the back ends of different electrical connectors to communicatively couple the corresponding electrical connectors. In a cable backplane system, the front ends of the coupled electrical connectors face in a common direction. In a cable midplane system, the front ends of the coupled electrical connectors can face in opposite directions. For example, a first array of the electrical connectors may face in a first direction and a second array of the electrical connectors may face in an opposite second direction. The electrical connectors of the first array may be communicatively coupled to the electrical connectors of the second array through the cables. The cables extend through a cavity of the cable midplane system.

In a known cable backplane system, the array of electrical connectors is formed by a plurality of brick assemblies that are stacked side-by-side. A brick assembly includes two parallel plates and a plurality of electrical connectors positioned between the parallel plates. The electrical connectors of each brick assembly are arranged side-by-side in a series that extends parallel to the plates such that the plates are separated by a height (or width) of only one electrical connector. When multiple brick assemblies are stacked in an array, each brick assembly forms one row or one column of the array.

The aforementioned cable backplane and midplane systems have been effective, and there has been a general market demand to increase the number and/or density of the electrical connectors. However, the available space between the parallel plates of each brick assembly is limited. As described above, the parallel plates are separated by a working gap that typically has a height (or width) that accommodates the height (or width) of a single electrical connector. As the number of electrical connectors and the associated cables increases, it can be more difficult to route and manage the cables within the working gap. In some cases, it may be necessary to twist the cables within the working gap, which may further complicate the routing of the cables.

Accordingly, a need remains for a mechanism or device that facilitates routing the cables between the arrays of electrical connectors.

BRIEF DESCRIPTION

In an embodiment, a ribbon assembly is provided that includes first and second contact modules that each include signal and ground contacts that are configured to engage electrical contacts of a corresponding mating connector. The ribbon assembly also includes a plurality of cables that are coupled to and extend between the first and second contact modules. The cables electrically couple the signal and ground contacts of the first contact module to the signal and ground contacts, respectively, of the second contact module. The cables extend parallel to one another and are coplanar at the first contact module and at the second contact module. The ribbon assembly also includes a cable organizer that is coupled to the plurality of cables at a location between and separate from the first and second contact modules. The cables extend parallel to one another and are coplanar as the cables extend through the cable organizer.

In an embodiment, a communication system is provided that includes first and second support panels that extend parallel to each other and have a cabling cavity therebetween. The communication system also includes a plurality of electrical connectors that are positioned between the first and second support panels. The electrical connectors have front ends that face an exterior of the communication system for engaging respective mating connectors. The electrical connectors form at least one connector stack in which the electrical connectors are aligned along a lateral axis and the front ends face in a common direction that is perpendicular to the lateral axis. The back ends of the at least one connector stack and the first and second support panels define a cabling cavity therebetween. The communication system also includes a plurality of ribbon assemblies that interconnect the electrical connectors of the at least one connector stack. Each of the ribbon assemblies includes a plurality of cables that extend through the cabling cavity and interconnect first and second electrical connectors of the plurality of electrical connectors. The cables of each ribbon assembly extend parallel to one another and are coplanar at the first electrical connector and at the second electrical connector. Each of the ribbon assemblies of the plurality of ribbon assemblies includes a cable organizer that couples to the cables of the corresponding ribbon assembly. The cables extend parallel to one another and are coplanar as the cables extend through the cable organizer.

Optionally, the cabling cavity between the first and second supports panels may be a first cabling cavity, and the electrical connectors may be first electrical connectors. The communication system may also include a third support panel that extends parallel to the first and second support panels and forms a second cabling cavity with the second support panel. The communication system may also include a plurality of second electrical connectors positioned within the second cabling cavity between the second and third support panels. The second electrical connectors may have front ends that face the exterior of the communication system. The second electrical connectors may form at least one connector stack in which the second electrical connectors are aligned along the lateral axis and the front ends of the second electrical connectors face in the common direction.

In an embodiment, a cable organizer is provided that includes first and second housing shells coupled to each other along an interface and forming a first receiving edge and a second receiving edge that face in opposite directions. The cable organizer also includes a plurality of channels formed between the first and second housing shells that extend between and are accessed through the first and second receiving edges. Each channel is sized and shaped to receive a single cable having at least one drain wire and only one pair of signal conductors. The channels extend parallel to one another between the first and second receiving edges and coincide with an organizer plane.

DETAILED DESCRIPTION

Figure 1:
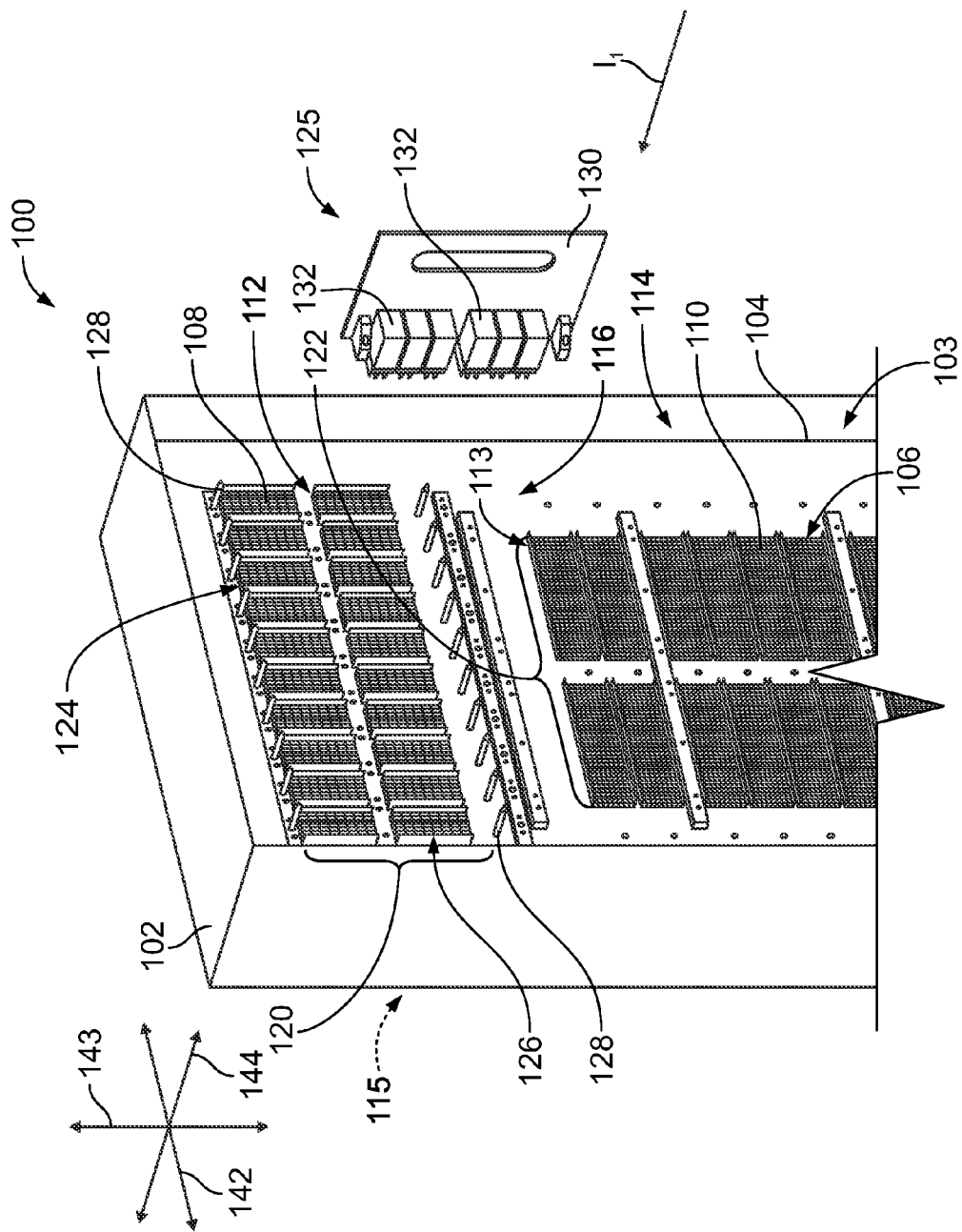
FIG. 1 is a front perspective view of a communication system formed in accordance with an embodiment.

Embodiments set forth herein may include communication systems or rack systems or sub-systems, which are hereinafter referred to generally as rack systems. In some embodiments, a plurality of rack systems may be stacked side-by-side to construct a communication system. In other embodiments, a communication system may include a single rack system. The communication systems may be, for example, cable backplane systems or cable midplane systems. Various embodiments include electrical connectors that are interconnected to other electrical connectors through cables.

As used herein, a cable midplane system has at least a first array and a second array of electrical connectors. The electrical connectors of the first array may face in a direction that is opposite the electrical connectors of the second array. The first and second arrays may mate with daughter card assemblies. The electrical connectors of the first array may be communicatively coupled to the electrical connectors of the second array through cables that extend between the electrical connectors. More specifically, the cables extend through one or more cabling cavities that are defined by a support frame of the cable midplane system. Accordingly, the daughter card assemblies that mate with the first array may be communicatively coupled to the daughter card assemblies that mate with the second array.

As used herein, a cable backplane system has only a single array of electrical connectors or multiple arrays that face in a common direction. For example, all of the electrical connectors of the cable backplane system may be positioned along one side of a backplane and face in the same direction. The electrical connectors may be communicatively coupled to each other through cables that are positioned behind the backplane.

Embodiments may also include ribbon assemblies and cable organizers. The ribbon assemblies may be used to construct the various electrical connectors, such as the electrical connectors of the cable midplane and backplane systems described herein. The cable organizers may facilitate routing the cables of the ribbon assemblies and, in particular, locating twists of the ribbon assemblies within a cabling cavity. Although various elements, components, and features may be described with reference to a cable midplane system or to a cable backplane system, it should be understood that such elements, components, and features may also be applicable to other communication systems or devices. Accordingly, some embodiments are not limited to cable backplane or midplane systems.

As used herein, phrases such as "a plurality of [elements]" and "an array of [elements]" and the like, when used in the detailed description and claims, do not necessarily include each and every element that a component may have. For example, the phrase "a plurality of ribbon assemblies having [a recited feature]" does not necessarily mean that each and every ribbon assembly has the recited feature. Other ribbon assemblies may not include the recited feature. Accordingly, unless explicitly stated otherwise (e.g., "each and every ribbon assembly of the rack system"), embodiments may include similar elements that do not have the recited features.

The communication systems may be used in various applications. By way of example only, the communication systems may be used in telecom and computer applications, routers, servers, supercomputers, and uninterruptible power supply (UPS) systems. One or more of the electrical connectors described herein may be similar to electrical connectors of the STRADA Whisper or Z-PACK TinMan product lines available through TE Connectivity. For example, one or more of the electrical connectors may be capable of transmitting data signals at high speeds, such as 10 gigabits per second (Gb/s), 20 Gb/s 30 Gb/s, or more. In more particular embodiments, one or more of the electrical connectors may be capable of transmitting data signals at 40 Gb/s, 50 Gb/s, or more. Each of the electrical connectors may include a high-density contact array that includes signal contacts. A high-density contact array may have, for example, at least 12 signal contacts per 100 mm$^2$ along a front end of the electrical connector. In more particular embodiments, the high-density contact array may have at least 15 signal contacts or at least 20 signal contacts per 100 mm$^2$ along the front end of the electrical connector.

FIG. 1 is a front perspective view of a portion of a communication system 100 formed in accordance with an embodiment. In an exemplary embodiment, the communication system 100 is a cable backplane system. In other embodiments, however, the communication system 100 may be a cable midplane system. For reference, the communication system 100 is oriented with respect to mutually perpendicular axes, including a mating axis 141, a first lateral axis 142, and a second lateral axis 143. In an exemplary embodiment, the second lateral axis 143 extends parallel to the force of gravity. However, embodiments set forth herein may have other orientations with respect to gravity. For example, the first lateral axis 142 may extend parallel to the force of gravity. Accordingly, it should be understood that the terms "mating axis," "first lateral axis," and "second lateral axis" are used only to distinguish different axes and are not intended to require a particular orientation with respect to gravity.

The communication system 100 may include a system chassis 102, one or more backplanes 104 coupled to and supported by the system chassis 102, and a rack system 106. The system chassis 102 includes a chassis cavity 103 where the backplane 104 and the rack system 106 are disposed. The rack system 106 includes electrical connectors 108, 110. In the illustrated embodiment, the backplane 104 includes windows 112, 113 that receive the electrical connectors 108, 110, respectively. The backplane 104 may be used to position and support the electrical connectors 108, 110 of the rack system 106. In other embodiments, the communication system 100 may not utilize a backplane 104. For example, the rack system 106 may be directly coupled to and entirely supported by the system chassis 102.

The rack system 106 includes an array 120 of the electrical connectors 108 and an array 122 of the electrical connectors 110. In the illustrated embodiment, each of the arrays 120, 122 is a two-dimensional array. As used herein, a two-dimensional array of electrical connectors includes a plurality of electrical connectors along a first lateral axis and a plurality of electrical connectors along a second lateral axis. For example, the array 120 includes a plurality of the electrical connectors 108 positioned along the first lateral axis 142 and a plurality of the electrical connectors 108 positioned along the second lateral axis 143. As shown in FIG. 1, the array 120 includes ten connector stacks or columns 124 of the electrical connectors 108 in which each connector stack 124 includes two of the electrical connectors 108. The array 120 may also be described as having two connector stacks or rows 126 of the electrical connectors 108 in which each connector stack 126 includes ten of the electrical connectors 108. As used herein, a connector stack may include at least two electrical connectors that are positioned adjacent to one another. In some embodiments, a connector stack includes at least three electrical connectors, at least five electrical connectors, or at least seven electrical connectors.

The electrical connectors 108, 110 may be electrical connectors that are interconnected to one another through cables (not shown), such as the cables 164 (shown in FIG. 2), that extend behind the backplane 104. In such embodiments, the electrical connectors 108, 110 and the cables eliminate interconnections via traces of a circuit board, such as those that may be used in more conventional backplane communication systems. The electrical connectors 108, 110 and the cables may have improved signal performance along the signal paths between various connectors of the communication system 100 as compared to conventional backplane communication systems.

The backplane 104 may be manufactured from printed circuit board (PCB) material known in the art, such as FR-4 material. In other embodiments, the backplane 104 may be formed from another suitable structure, such as sheet metal. The backplane 104 is disposed within the chassis cavity 103. The chassis cavity 103 is accessible through a front or first opening 114 of the communication system 100 and an opposite back or second opening 115. During assembly of the communication system 100, the backplane 104 and/or the rack system 106 may be loaded into the chassis cavity 103 through the front opening 114 or through the back opening 115. In addition to the rack system 106, the system chassis 102 may support other components (not shown) of the communication system 100, such as power supplies, cooling fans, and the like.

The backplane 104 has a first or front side 116 and an opposite second or back side (not shown) and includes the windows 112, 113 that extend through the backplane 104. When the rack system 106 interfaces with the backplane 104 along the second side, the windows 112, 113 permit the electrical connectors 108, 110, respectively, to extend through the windows 112, 113 to be presented along the first side 116 for engaging one or more daughter card assemblies 125. To this end, the rack system 106 may include a plurality of guide pins 128 that are configured to engage and align the backplane 104 relative to the rack system 106. The guide pins 128 may also engage the daughter card assemblies 125 when the daughter card assemblies 125 are mated with the electrical connectors 108.

Depending on the configuration and purpose of the daughter card assemblies 125, the daughter card assemblies 125 may be referred to as line cards or switch cards. As shown in FIG. 1, the daughter card assembly 125 includes a circuit board (or daughter card) 130 and card connectors 132 positioned along a leading edge of the circuit board 130. In certain embodiments, the electrical connectors 108, 110, and the card connectors 132 are high-speed differential connectors, such as the STRADA Whisper or Z-PACK TinMan electrical connectors available through TE Connectivity.

The daughter card assemblies 125 are configured to be advanced toward the communication system 100 in an insert direction $I_1$ along the mating axis 141. The backplane 104 is coupled to the system chassis 102 and held in a position such that the backplane 104 coincides with a plane defined by the first and second lateral axes 142, 143. The arrays 120 and 122 may extend parallel to or coincide with the plane defined by the first and second lateral axes 142, 143.

Figure 2:
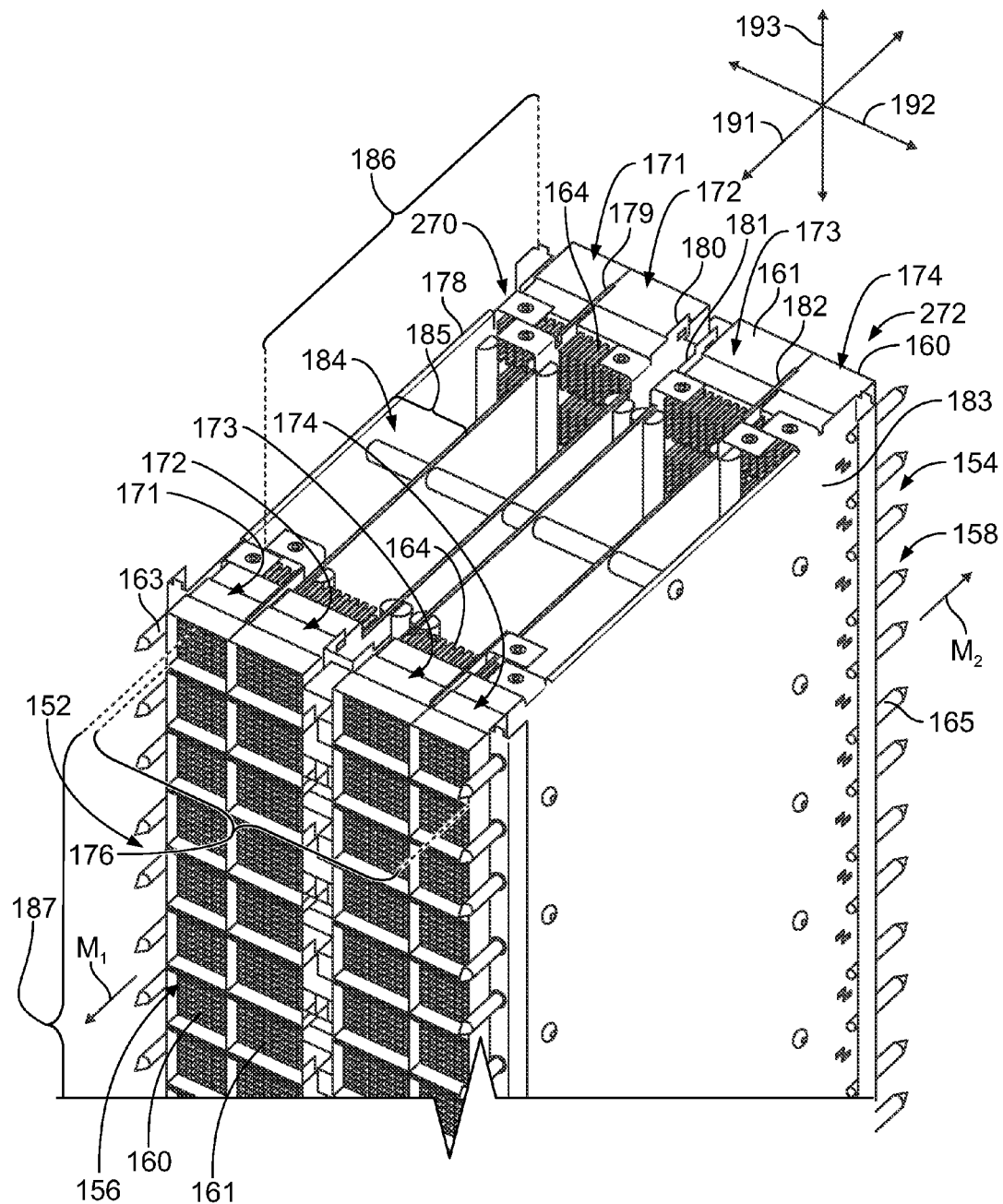
FIG. 2 is a perspective view of a rack system that may be formed in accordance with an embodiment.

FIG. 2 is a perspective view of a rack system 150. The rack system 150 is oriented with respect to mutually perpendicular axes 191, 192, 193, which include a mating axis 191, a first lateral axis 192, and a second lateral axis 193. The rack system 150 may be similar to or used with a communication system, such as the communication system 100 (FIG. 1). In certain embodiments, the rack system 150 may be used with a cable midplane system. For example, two of the rack systems 150 may be positioned adjacent to each other and within a system chassis (not shown) to form the cable midplane system. In other embodiments, the rack system 150 alone may be mounted to a system chassis to form the cable midplane system or other communication system.

The rack system 150 includes first and second mating interfaces 152, 154 that face in respective opposite directions along the mating axis 191. The first and second mating interfaces 152, 154 include elements and features of the rack system 150 that are exposed or presented to an exterior of the rack system 150. For example, the mating interface 152 includes a first array 156 of electrical connectors 160, 161 and guide posts 163, and the second mating interface 154 includes a second array 158 of electrical connectors 160, 161 and guide posts 165. The electrical connectors 160, 161 and the guide posts 163, 165 are presented to an exterior of the rack system 150 for engaging other devices. For example, the electrical connectors 160, 161 and the guide posts 163 along the first mating interface 152 may engage daughter card assemblies (not shown), such as the daughter card assemblies 125 (FIG. 1).

The electrical connectors 160, 161 may be interconnected to one another through cables 164. For illustrative purposes, only portions of the cables 164 that are coupled to the electrical connectors 160, 161 are shown in FIG. 2. In an exemplary embodiment, the electrical connectors 160, 161 of the first array 156 are interconnected (or communicatively coupled) to the electrical connectors 160, 161 of the second array 158 through the cables 164. In other embodiments, one or more of the electrical connectors 160, 161 may be interconnected to one more of the electrical connectors 160, 161 of the same mating interface. In alternative embodiments, the rack system 150 is part of a cable backplane system such that only one mating interface exists.

Each of the first and second arrays 156, 158 includes a plurality of connector stacks 171, 172, 173, 174. Each connector stack 171-174 includes a plurality or series of the corresponding electrical connectors. More specifically, each of the connector stacks 171, 174 includes a series of the electrical connectors 160 arranged side-by-side along the second lateral axis 193. Each of the connector stacks 172, 173 includes a series of the electrical connectors 161 arranged side-by-side along the second lateral axis 193. Each of the connector stacks 171-174 may constitute an individual column of electrical connectors of the array 156. In the illustrated embodiment, the electrical connectors of each connector stack are arranged side-by-side such that adjacent electrical connectors engage each other or have a nominal gap therebetween. In alternative embodiments, the electrical connectors of one or more of the connector stacks 171-174 are spaced apart from each other. For example, one or more of the connector stacks 171-174 may be similar to the connector stack 444 (shown in FIG. 10) of the rack system 400 (shown in FIG. 10) or the connector stack 520 (shown in FIG. 11) of the rack system 500 (shown in FIG. 11).

The rack system 150 includes a support frame 176 that holds the first and second arrays 156, 158. The support frame 176 is configured to be held by a system chassis (not shown) and may include a number of interconnected support panels. For example, in the illustrated embodiment, the support frame 176 includes support panels 178, 179, 180, 181, 182, 183. The support panels 178-183 may be stamped and formed from sheet metal to include the features described herein. The support panels 178-183 may also be referred to as plates or walls. Adjacent support panels define a corresponding cabling cavity therebetween. For example, the support panels 178, 179 and the opposite connector stacks 171 of the first and second arrays 156, 158 define a cabling cavity 184 therebetween. The cables 164 extend through the cabling cavity 184 between the support panels 178, 179 and interconnect the corresponding electrical connectors 160 of the connector stacks 171.

As shown, the cabling cavity 184 has a width 185 that is measured along the first lateral axis 192 between the support panels 178, 179. The cabling cavity 184 has a depth 186 that is measured along the mating axis 191 between the connector stacks 171. The cabling cavity 184 may also have a height 187 (only a portion of the height 187 is shown) that is measured along the second lateral axis 193. As described below, in some embodiments, available space within the cabling cavity 184 is relatively limited such that the cables 164 are compressed between the support panels 178, 179 within certain regions of the cabling cavity 184. In such embodiments, the compression of the cables 164 may facilitate holding the cables 164 at designated positions within the cabling cavity 184. By way of example, the width 185 may be about two centimeters (cm) to about four cm or, more particularly, about 2.5 cm. The depth 186 may be about fifteen (15) cm to about twenty (20) cm or, more particularly, about eighteen (18) cm. The height 187 may be about forty (40) cm to about eighty (80) cm. In particular embodiments, the height 187 may be about sixty-five cm. It should be understood, however, that embodiments may have other dimensions than those provided above.

Each of the support panels 178-183 extends transverse to the first and second arrays 156, 158. More specifically, the electrical connectors 160, 161 of the first array 156 are generally co-planar such that the first array 156 extends parallel to a plane that is defined by the first lateral axis 192 and the second lateral axis 193. Likewise, the electrical connectors 160, 161 of the second array 158 are generally co-planar such that the second array 158 extends parallel to the plane that is defined by the first lateral axis 192 and the second lateral axis 193. Each of the support panels 178-183 extends along a plane that is parallel to the second lateral axis 193 and the mating axis 191. Accordingly, the support panels 178-183 extend transverse to the first and second arrays 156, 158. Because the first and second arrays 156, 158 extend between the support panels 178, 183, the support panels 178, 183 may be referred to as the outer support panels 178, 183. The support panels 179, 182 may be referred to as shared support panels as each of the shared support panels 179, 182 is positioned between and directly engages two of the connector stacks. The support panels 180, 181 may be referred to as inner support panels. The inner support panels 180, 181 are spaced apart from each other when the rack system 150 is fully assembled. The rack system 150 may be assembled from rack sub-assemblies 270, 272, which are described in greater detail below with respect to FIGS. 6 and 7.

Figure 3:
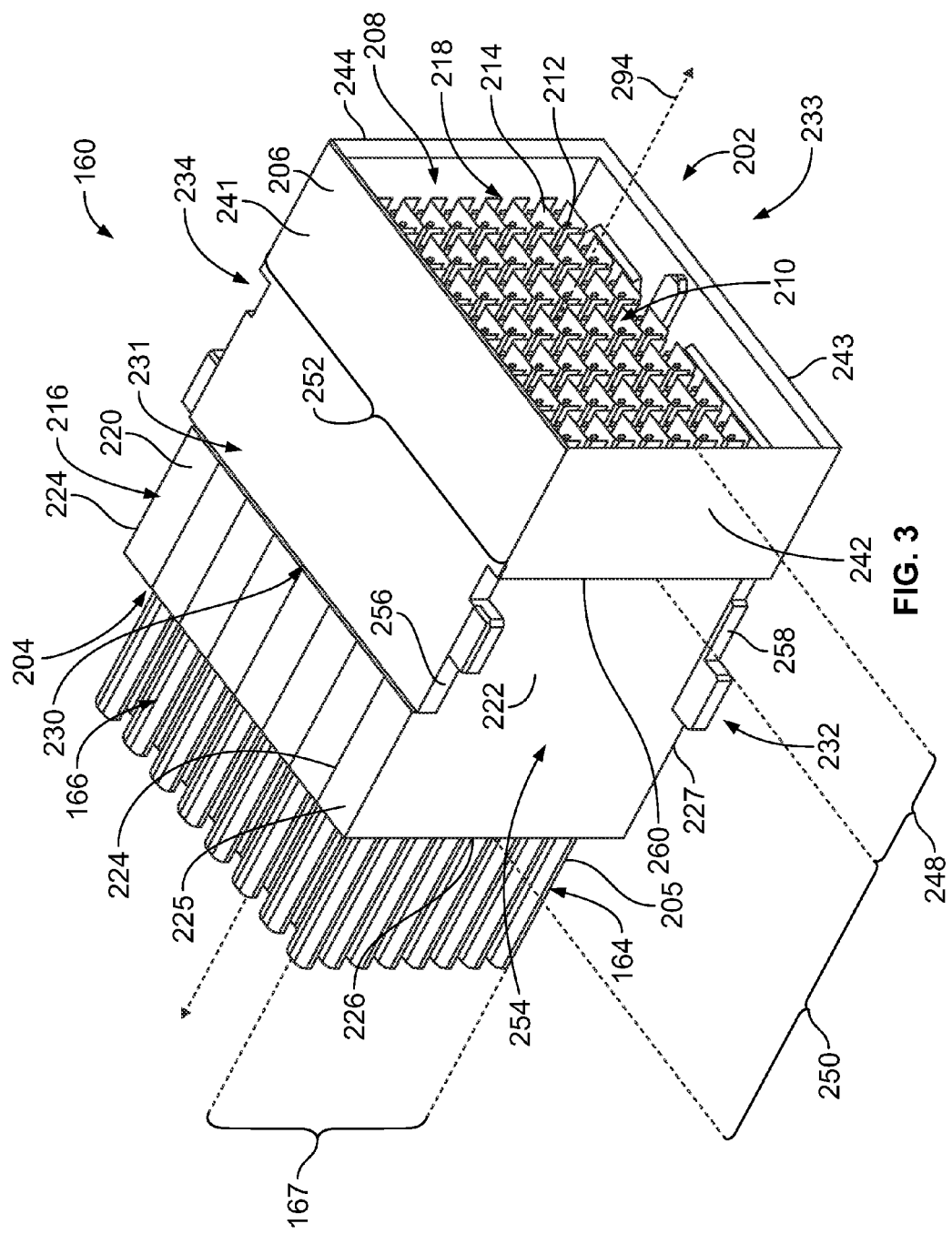
FIG. 3 is an isolated perspective view of an electrical connector that may be used with the rack system of FIG. 2.

FIG. 3 is an isolated perspective view of the electrical connector 160. Although the following is described with reference to the electrical connector 160, the electrical connector 161 (FIG. 2) may have similar features. The electrical connector 160 includes a front end 202 and a back end 204 that face in respective opposite directions along a central axis 294 that extends through the electrical connector 160. When the electrical connector 160 is positioned within the rack system 150 (FIG. 2), the central axis 294 extends parallel to the mating axis 191 (FIG. 2). The electrical connector 160 includes a connector housing or shroud 206 having a mating cavity 208 that opens to the front end 202. The electrical connector 160 also includes a contact array 210 of electrical contacts that are disposed within the mating cavity 208. The electrical contacts include signal contacts 212 and ground contacts 214. The contact array 210 may be a high-density contact array.

The signal and grounds contacts 212, 214 may form contact assemblies 218 of the electrical connector 160. In the illustrated embodiment, each of the contact assemblies 218 includes a pair of the signal contacts 212 and a corresponding ground contact 214 that surrounds the pair of the signal contacts 212. The ground contact 214 of each contact assembly 218 partially surrounds the corresponding signal contacts 212 along a length of the signal contacts 212 to ensure that the signal paths are electrically shielded from interference. The ground contacts 214 are C-shaped in the illustrated embodiment, but may be shaped differently in other embodiments. In other embodiments, a plurality of ground contacts may immediately surround each pair of the signal contacts 212.

As described above, the electrical connector 160 is configured to be interconnected to other electrical connectors 160 through a bundle 166 of corresponding cables 164. The cables 164 are coupled to the back end 204. In an exemplary embodiment, the cables 164 are twin axial cables having two signal conductors (not shown) and at least one drain wire within a common jacket 205 of the cable 164. The cables 164 may be similar or identical to the cables 334 (shown in FIG. 4) or the cables 427 (shown in FIG. 10). Each pair of signals contacts 212 may be terminated to the two signal conductors of a corresponding cable 164. In some embodiments, the signal conductors convey differential signals to the pairs of signal contacts 212. In an exemplary embodiment, the signal conductors are shielded, such as with a cable braid (not shown) of the cable 164. Optionally, each of the signal conductors may be individually shielded. Other types of cables 164 may be provided in alternative embodiments. For example, the cable 164 may be a coaxial cable carrying a single signal conductor.

The electrical connectors 160 are configured to mate with corresponding card connectors (not shown), such as the card connectors 132 (FIG. 1). In an exemplary embodiment, the electrical connectors 160 are high speed differential pair electrical connectors that include a plurality of differential pairs of conductors. The differential pairs of conductors are shielded along the signal paths thereof to reduce noise, crosstalk, and other interference along the signal paths of the differential pairs.

In some embodiments, the electrical connectors 160 include a plurality of contact modules 216 that are held by the connector housing 206. Each of the contact modules 216 includes a series of the contact assemblies 218 and a module body 220 that holds the series of the contact assemblies 218. The module body 220 may include a dielectric material and optional shields that provide support for the contact assemblies 218. The module body 220 includes opposite side surfaces 222, 224 and body edges 225, 226, 227 that extend between the side surfaces 222, 224. The body edge 226 may be referred to as a loading edge, and the body edges 225, 227 may be referred to as longitudinal edges.

In the illustrated embodiment, the cables 164 extend through the body edge 226 and into the module body 220 such that the module body 220 supports a cable array 167 of the cables 164. As shown, the cables 164 of each cable array 167 extend parallel to one another and are coplanar at the corresponding contact module 216. It is understood, however, that the cables 164 may bend or flex as the cables 164 extend further from the corresponding contact module 216. To control routing of the cables 164, embodiments may utilize cable organizers, such as the cable organizers 350 (shown in FIG. 8). The module body 220 may provide strain relief for the cables 164 of the cable array 167. Accordingly, the bundle 166 includes the cables 164 of each cable array 167. In the illustrated embodiment, the bundle 166 includes the cable arrays 167 of eight contact modules 216 in which each cable array 167 has eight cables 164. Thus, the bundle 166 includes sixty-four (64) cables 164. It should be understood, however, that the total number of cables may differ in other embodiments based upon the application. As described below, each cable array may be part of a ribbon assembly that interconnects two contact modules.

The connector housing 206 includes the front end 202 of the electrical connector 160 and also a loading end or side 230. The mating cavity 208 extends between the front end 202 and the loading end 230. As shown, the contact modules 216 may be loaded into the connector housing 206 through the loading end 230. The connector housing 206 holds the contact modules 216 side-by-side in a stacked arrangement such that the contact assemblies 218 are positioned in parallel columns. In the illustrated embodiment, there are eight contact modules 216, but any number of the contact modules 216 may be held by the connector housing 206 depending on the particular application.

As shown in FIG. 3, the electrical connector 160 has connector sides 231, 232, 233, 234. Each of the connector sides 231-234 extends between the front end 202 and the back end 204 along the central axis 294. In the illustrated embodiment, each of the connector sides 231-234 is defined by a portion of the connector housing 206 and one or more portions of the contact modules 216. For example, the connector housing 206 includes housing sides 241, 242, 243, 244. The connector sides 231-234 include the housing sides 241-244, respectively, and corresponding portions of the contact modules 216. For example, the connector side 232 includes the housing side 242 and the corresponding side surface 222 of the corresponding module body 220. The connector side 234 includes the housing side 244 and corresponding side surface 224 of the corresponding module body 220. The connector side 231 includes the housing side 241 and the body edges 225 of the module bodies 220. The connector side 233 includes the housing side 243 and the body edges 227 of the module bodies 220.

In some embodiments, each of the electrical connectors 160 interfaces with at least two of the support panels 178-183 (FIG. 2). In certain embodiments, each of the electrical connectors 160 interfaces with at least two of the support panels 178-183 and at least two other electrical connectors 160. As used herein, the term "interfaces with" and the like includes a surface of a first component (i) directly engaging a surface of an adjacent second component or (ii) directly facing the surface of the adjacent second component with a nominal gap therebetween. In other embodiments, the electrical connectors 160 may be spaced apart from each other.

Each of the connector sides 232, 234 may interface with a connector side of an adjacent electrical connector and one of the support panels 178-183 (FIG. 2). To this end, the connector side 232 includes a platform portion or section 248 that interfaces with an adjacent electrical connector 160, and a recessed portion 250 that interfaces with one of the support panels 178-183. The platform portion 248 is proximate to the front end 202, and the recessed portion 250 is proximate to the back end 204. The platform portion 248 is configured to abut another platform portion of another electrical connector. The recessed portion 250 may represent a portion of the electrical connector 160 having a reduced width 252 relative to the width 252 of the platform portion 248. in the illustrated embodiment, the platform portion 248 of the connector side 232 includes the housing side 242. The housing side 242 is substantially planar or flat. The recessed portion 250 has a panel-receiving recess 254 that is defined by the side surface 222 of one of the contact modules 216, side edges 256. 258 of the housing sides 241, 243, respectively, and a rear edge 260 of the housing side 242. The rear edge 260 faces toward the back end 204 in a direction along the central axis 294. When the rack system 150 (FIG. 2) is fully constructed, the rear edges 260 of the electrical connectors 160 may at least partially cover an edge of the shared support panel 179 (FIG. 2).

Figure 5:
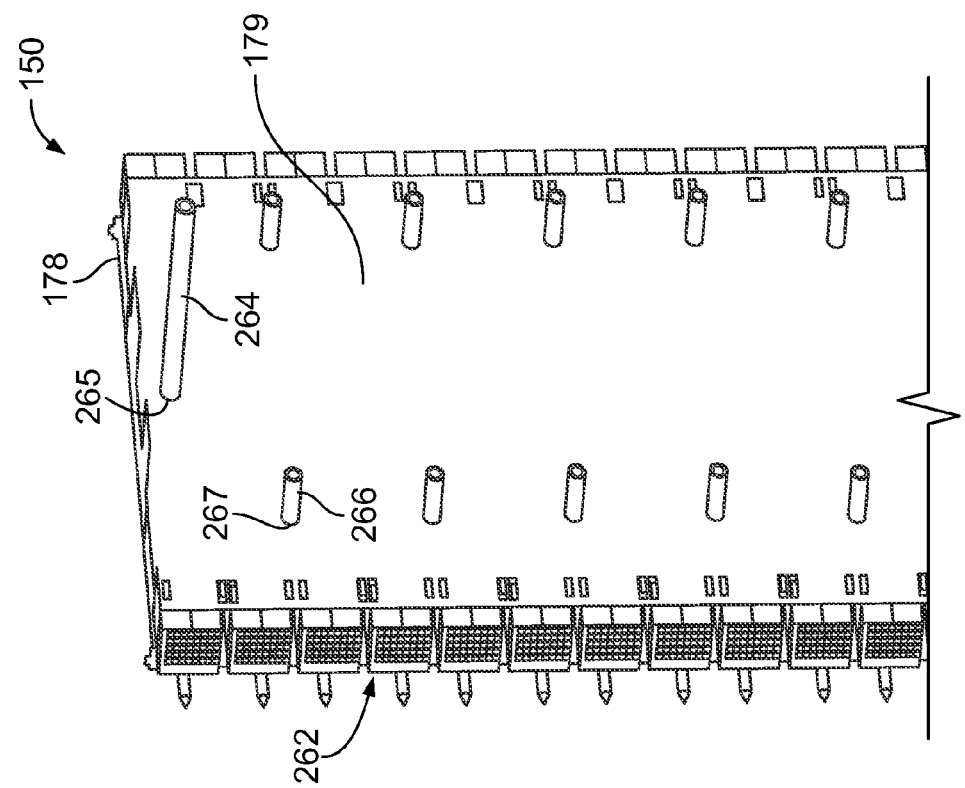
FIG. 5 is another perspective view of the incomplete rack system illustrating a subsequent stage during the construction of the rack system of FIG. 2.
Figure 4:
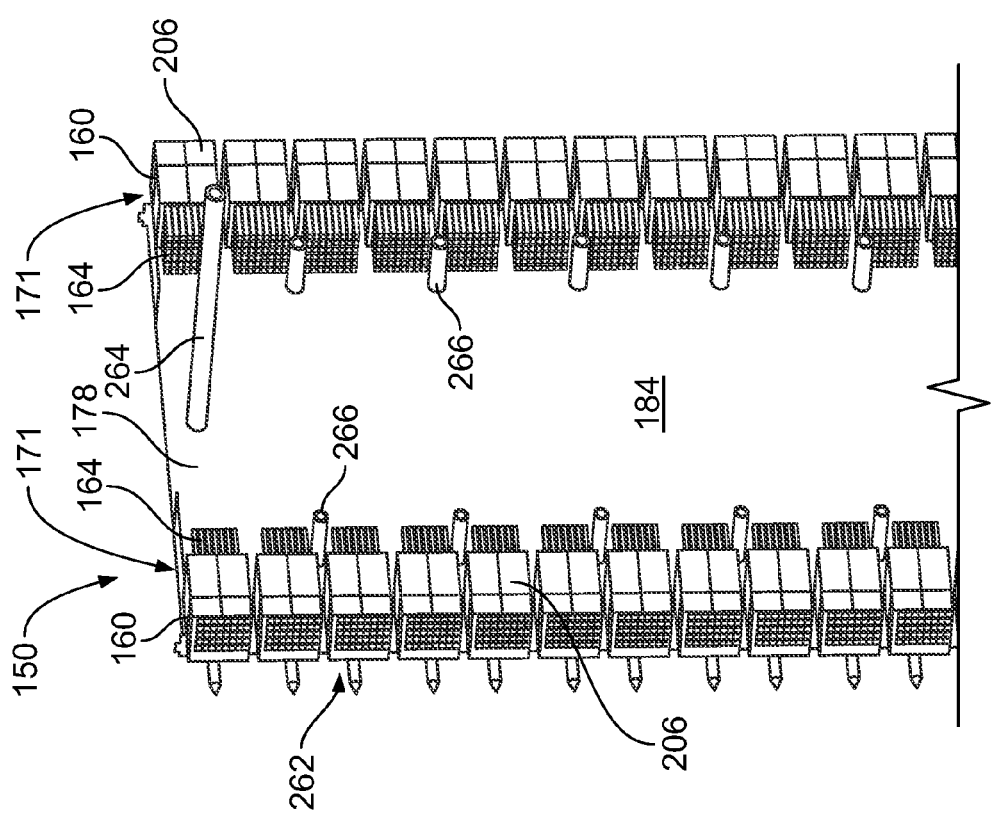
FIG. 4 is a perspective view of an incomplete rack system illustrating one stage during the construction of the rack system of FIG. 2.

FIGS. 4 and 5 illustrate different stages of assembling the rack system 150. FIG. 4 is a perspective view of the outer support panel 178 and a first connector layer 262. The first connector layer 262 includes the electrical connectors 160 that will be part of the arrays 156, 158 (FIG. 2) along the mating interfaces 152, 154 (FIG. 2), respectively. The first connector layer 262 includes the connector stacks 171 of the first and second arrays 156, 158. The electrical connectors 160 of the opposite connector stacks 171 are interconnected through the cables 164. For illustrative purposes, only portions of the cables 164 are shown in FIG. 4, but it should be understood that the cables 164 are routed through the cabling cavity 184 between the connector stacks 171. For example, the cables 164 may be routed in a manner that is similar to the cables 427 shown in FIG. 10.

To assemble the rack system 150, the cable connectors 160 of each of the connector stacks 171 are positioned with respect to the support panel 178. Prior to positioning the electrical connectors 160, the outer support panel 178 may be positioned horizontally such that gravity pulls the electrical connectors 160 toward the outer support panel 178, In some embodiments, the electrical connectors 160 may include features that facilitate positioning the electrical connectors 160 relative to the support panel 178. For example, the connector housings 206 of the electrical connectors 160 may include lateral projections (not shown) that extend into openings (not shown) of the support panel 178.

Before, during, or after the assembly of the first connector layer 262, elongated coupling posts or rods 264, 266 may be coupled to the outer support panel 178. The coupling posts 264, 266 have different lengths. The coupling post 264 is configured to extend through the support panels 179-182 (FIG. 2) and engage the support panel 183 (FIG. 2). The coupling posts 266, on the other hand, are configured to extend through the shared support panel 179 (FIG. 2) and couple to the inner support panel 180 (FIG. 2).

FIG. 5 is a perspective view of the incomplete rack system 150 in which the shared support panel 179 has been positioned over the first connector layer 262. The shared support panel 179 includes post openings 265, 267 that receive the coupling posts 264, 266, respectively. After the shared support panel 179 is positioned over the first connector layer 262, a second connector layer (not shown in FIG. 5) that includes the connector stacks 172 (FIG. 2) may be positioned with respect to the shared support panel 179. The inner support panel 180 (FIG. 2) may then be positioned over the second connector layer. The above assembly steps may be repeated until the rack system 150 is completely formed as shown in FIG. 2.

Returning to FIG. 2, the rack system 150 may include a rack sub-assembly 270 and a rack sub-assembly 272. The rack sub-assembly 270 includes the connector stacks 171, 172 along both of the first and second arrays 156, 158 and the support panels 178-180. The rack sub-assembly 272 includes the connector stacks 173, 174 along both of the first and second arrays 156, 158 and the support panels 181-183. The rack sub-assembly 272 may be constructed in a similar manner as the rack sub-assembly 270 and may be joined to the rack sub-assembly 270. For example, the coupling post 264 may extend entirely through each of the rack sub-assemblies 270, 272. The coupling post 264 may be secured to the outer support panels 178, 183. As such, the support panels 178-183 may be coupled directly or indirectly to one another and held in substantially fixed positions with respect to one another. The rack system 150 may then be inserted into a system chassis, such as the system chassis 102 (FIG. 1) of the communication system 100 (FIG. 1).

Accordingly, each of the connector stacks 171 of the first and second arrays 156, 158 is located between the outer support panel 178 and the shared support panel 179. The electrical connectors 160 of the connector stacks 171 directly engage both the outer support panel 178 and the shared support panel 179. Each of the connector stacks 172 of the first and second arrays 156, 158 is located between the shared support panel 179 and the inner support panel 180. The electrical connectors 161 of the connector stacks 172 directly engage both the shared support panel 179 and the inner support panel 180. The connector stacks 173, 174 may be held by the support frame 176 in a similar manner. When the rack system 150 is fully constructed, the electrical connectors 160, 161 of the first array 156 face in a common mating direction $M_1$, and the electrical connectors 160, 161 of the second array 158 face in a common mating direction $M_2$ that is opposite the mating direction $M_1$.

Figure 6:
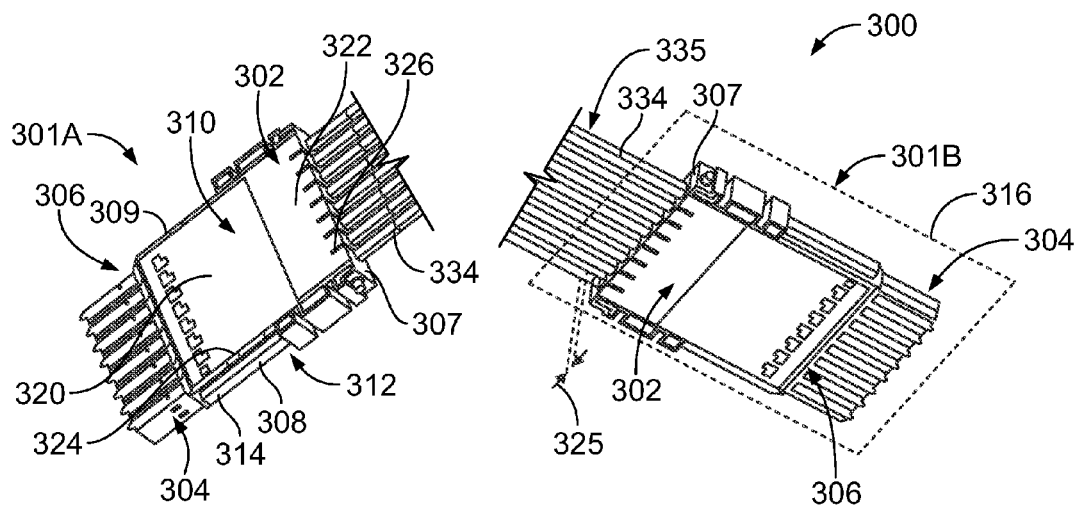
FIG. 6 illustrates two ends of a ribbon assembly that may be used with the rack system of FIG. 2.

FIG. 6 is a perspective view of a ribbon assembly 300 in accordance with an embodiment that includes a pair of contact modules 301A, 301B and a plurality of cables 334 extending between the contact modules 301A, 301B that mechanically and electrically couple the contact modules 301A, 301B. The ribbon assembly 300 may be used to form electrical connectors, such as the electrical connectors 160, 161 (FIG. 2), and rack systems, such as the rack system 150 (FIG. 2). For example, the contact module 301A may replace the contact module 216 (FIG. 3) and be positioned within a connector housing, such as the connector housing 206 (FIG. 3), with other contact modules 301A.

The cables 334 of the ribbon assembly 300 form a cable array 335. The cables 334 of the cable array 335 are individual cables that may extend generally parallel to one another as the cables 334 extend between the contact modules 301A, 301B. As shown with respect to the contact module 301B, adjacent cables 334 of the cable array 335 are separated by a cable gap 325 when immediately adjacent to or within the contact module 301B. The cables 334 are separate or discrete such that the cables 334 are capable of moving independently. Thus, as the cables 334 extend further away from the contact module 301B (or the contact module 301A), the cables 334 may be free to move relative to one another and thereby increase or decrease the size of the cable gap 325. For example, the cables 334 may bend away from each other, engage each other, or overlap each other as the cables 334 extend between the contact modules 301A, 301B. Cable organizers, such as the cable organizer 350 shown in FIG. 8, may be configured to maintain the relative positions among the cables 334 of the cable array 335.

The following is with reference to the contact module 301A in FIG. 6, but it should be understood that the contact module 301B may include similar or identical elements and features. The contact module 301A includes a module body 302 that is configured to hold a plurality of the contact assemblies 304. The module body 302 may comprise a dielectric material and include body edges 306, 307, 308, 309. The body edges 306-309 include a leading edge 306, a loading edge 307, and longitudinal edges 308, 309 that extend between the leading and loading edges 306, 307. The contact assemblies 304 are positioned along the leading edge 306. The leading and loading edges 306, 307 may face in opposite directions and extend substantially perpendicular to the longitudinal edges 308, 309. The contact module 301A also include opposite module sides 310, 312. The body edges 306-309 extend between the module sides 310, 312.

The contact module 301A may include guide features 314 that extend along the longitudinal edges 308, 309. In the illustrated embodiment, the guide features 314 are elongated projections or rails that extend lengthwise along the corresponding longitudinal edge. In alternative embodiments, the guide features 314 may be channels or grooves that extend along the longitudinal edges 308, 309 and are configured to receive projections or rails of the connector housing (not shown).

The module body 302 of the contact module 301A may include a first shield 320 and a second shield 322 that are located along the module side 310. Alternatively, the first and second shields 320, 322 may be located along the module side 312. The first and second shields 320, 322 extend between the signal paths of adjacent contact modules to shield the signal paths from crosstalk. As shown, the first shield 320 extends between the longitudinal edges 308, 309 and along the leading edge 306. The first shield 320 may be a substantially planar panel or wall that is stamped and formed from sheet metal. The first shield 320 may include grip elements 324 that are configured to engage the module body 302. The grip elements 324 may be fingers or projections that extend into and engage the module body 302.

The second shield 322 extends between the longitudinal edges 308, 309 and along the loading edge 307. The second shield 322 may also be a substantially planar panel or wall and include grip elements 326 that are configured to engage the module body 302 along or proximate to the loading edge 307. When combined, the first and second shields 320, 322 may cover substantially the entire module side 310. In alternative embodiments, a single shield may extend along the module side 310 instead of multiple shields.

With reference to the contact module 301B, the cables 334 extend through the loading edge 307 and into the module body 302. Each of the cables 334 is electrically coupled to one of the contact assemblies 304. The contact assemblies 304 are stacked with respect to one another along the leading edge 306 of the module body 302 such that the contact assemblies 304 coincide with an array plane 316. The cables 334 are coplanar and extend parallel to one another at the contact module 301B. In particular embodiments, the cables 334 coincide with the array plane 316 as the cables 334 extend through the module body 302 and exit the loading edge 307. As indicated by the dashed line along the contact module 301B and the cables 334, the array plane 316 intersects the cables 334 of the cable array 335 and the contact module 301B. Also shown, the cable gaps 325 may be the same size between each pair of adjacent cables 334 such that the cables 334 are spaced apart from each other in a uniform manner. In other embodiments, the cable gaps 325 may vary.

Figure 7:
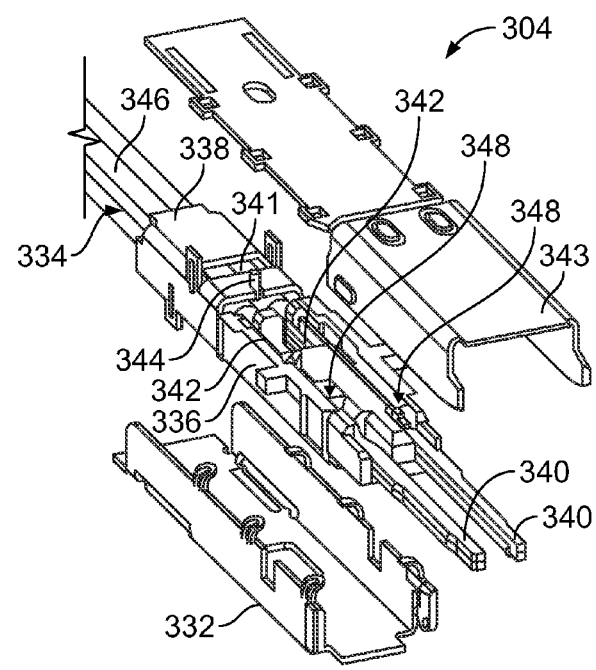
FIG. 7 illustrates an exploded view of a contact assembly that may be used with the ribbon assembly of FIG. 6.

FIG. 7 is an exploded view of one of the contact assemblies 304 in accordance with an embodiment. As described herein, the contact assembly 304 includes a pair of signal contacts 340 and a ground contact 341 The contact assembly 304 may also include a ground shield 332, a support body 336, and a ground ferrule 338. As shown, a terminating end 341 of the cable 334 is stripped to expose a pair of signal conductors 342 and a drain wire 344. The signal conductors 342 may be shielded along a length of the cable 334 to reduce noise, crosstalk, and other interference along the signal paths. In particular embodiments, the cables 334 are twin axial cables having the two signal conductors 342 and the drain wire 344 surrounded by a common jacket 346 of the cable 334. The signal conductors 342 and the drain wire 344 extend parallel to each other through the jacket 346 and are configured to convey differential signals. It is noted, however, that other types of cables, such as coaxial cables, may be used in alternative embodiments.

The support body 336 is configured to hold the signal contacts 340 at designated positions for termination to the respective signal conductors 342. In the illustrated embodiment, the support body 336 has two contact channels 348 that each includes one of the signal contacts 340 disposed therein. The contact channels 348 are generally open along a side of the support body 336 to receive the signal contacts 340 therein. The support body 336 may include features to secure the signal contacts 340 in the respective contact channels 348. For example, the signal contacts 340 may be held by an interference fit therein.

The signal conductors 342 from the cable 334 are configured to extend into the contact channels 348 of the support body 336 for termination to the corresponding signal contacts 340. The support body 336 is shaped to guide or position the signal conductors 342 therein for termination. In an exemplary embodiment, the signal conductors 342 may be terminated to the signal contacts 340 in-situ after being loaded into the support body 336. For example, the support body 336 may position the signal contacts 340 and the corresponding signal conductors 342 in direct physical engagement. The signal contacts 340 and the corresponding signal conductors 342 may then be coupled together, such as through welding or soldering.

The ground ferrule 338 is secured to the terminating end 341 of the cable 334. The ground ferrule 338 is configured to be electrically coupled to the drain wire 344 and/or the ground contact 343 and the ground shield 332. The ground contact 343 and the ground shield 332 are configured to be coupled to each other such that the support body 336, the signal contacts 340, and the signal conductors 342 are located between the ground contact 343 and the ground shield 332. In this manner, the ground contact 343 and the ground shield 332 may peripherally surround the signal paths along the signal conductors 342 and signal contacts 340.

Figure 8:
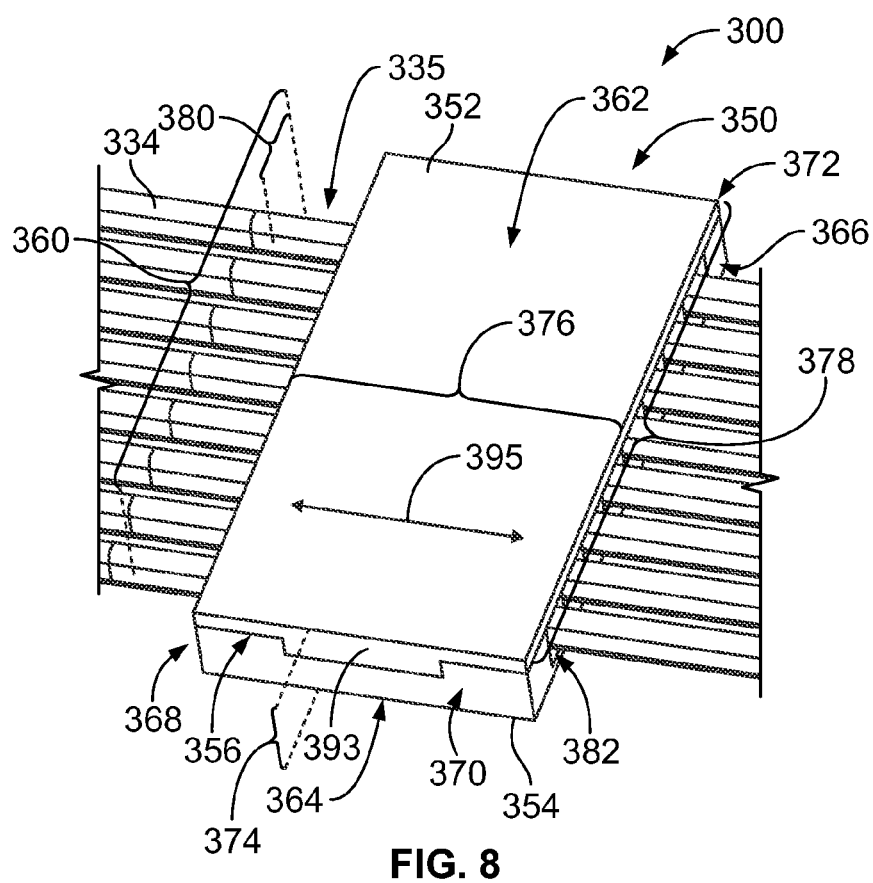
FIG. 8 is a perspective view of a portion of the ribbon assembly of FIG. 6 that includes a cable organizer.

FIG. 8 is a perspective view of a portion of the ribbon assembly 300 that includes the cable array 335 of the cables 334 and a cable organizer 350 that is coupled to the cable array 335. The cable organizer 350 is coupled to the plurality of cables 334 at a location between and separate from the first and second contact modules 301A, 301B (FIG. 6). The cable organizer 350 is configured to hold the cables 334 in substantially fixed positions with respect to one another as the cables 334 extend through the cable organizer 350. The cable array 335 has a lateral dimension or array width 360 that is measured transverse to the length of the cable array 335 between outer surfaces or edges of the two outermost cables 334 of the cable array 335. The lateral dimension 360 may increase or decrease based on the positions of the outermost cables 334 with respect to each other. As the cable array 335 exits/enters the cable organizer 350 or exits/enters the module body 302 (FIG. 6), the lateral dimension 360 is based on how the cables 334 are held by the cable organizer 350 or the module body 302, respectively. However, the lateral dimension 360 may increase or decrease as the cables 334 extend further away from the cable organizer 350 or away from the module body 302. As described herein, the lateral dimension 360 may be re-oriented as the cables 334 are routed through a cabling cavity, such as the cabling cavity 184 (FIG. 2).

In the illustrated embodiment, the cable organizer 350 includes a first housing shell 352 and a second housing shell 354 that are coupled to each other along an interface 356. The cable organizer 350 includes a first broad side 362 and a second broad side 364 that face in opposite directions. In the illustrated embodiment, the first housing shell 352 includes the first broad side 362, and the second housing shell 354 includes the second broad side 364. The cable organizer 350 also includes a first receiving edge 366 and a second receiving edge 368 that face in opposite directions, and opposite longitudinal edges 370, 372 that extend between the first and second receiving edges 366, 368. Each of the first receiving edge 366, the second receiving edge 368, the longitudinal edge 370, and the longitudinal edge 372 extends between the first and second broad sides 362, 364. Each of the first receiving edge 366, the second receiving edge 368, the longitudinal edge 370, and the longitudinal edge 372 is formed from both the first housing shell 352 and the second housing shell 354.

The cable organizer 350 includes a plurality of channels 382 that are formed between the first and second housing shells 352, 354. In the illustrated embodiment, the cable organizer 350 includes eight channels 382, but it should be understood that other embodiments may include fewer or more channels. For example, the cable organizer 350 may include at least three channels 382, at least four channels 382, at least five channels 382, at least six channels 382, at least seven channels 382, at least nine channels 382, or at least twelve channels 382. In the illustrated embodiment, the number of channels 382 is equal to the number of cables 334 of the cable array 335. In other embodiments, the number of channels 382 is less than the number of cables 334 of the cable array 335. In such embodiments, the ribbon assembly 300 may optionally include more than one cable organizer 350. In other embodiments, the number of channels 382 is greater than the number of cables 334 of the cable array 335. In such embodiments, the ribbon assembly 300 may share a cable organizer with other ribbon assemblies (not shown).

Figure 9:
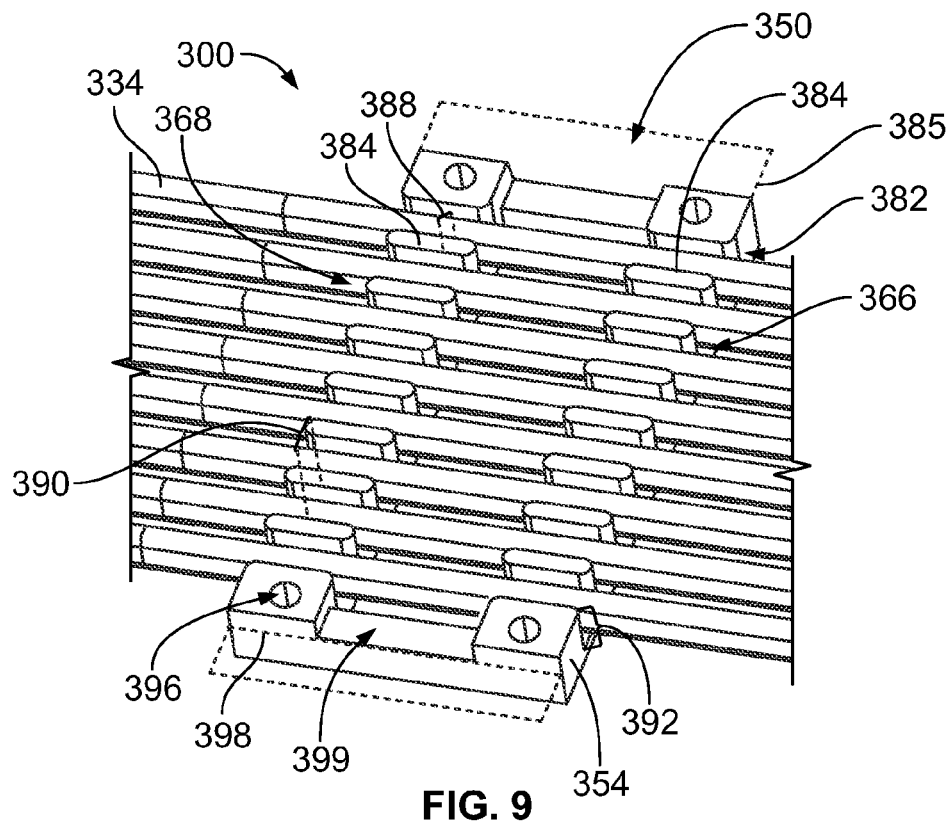
FIG. 9 is a perspective view of a portion of the ribbon assembly of FIG. 6 with a housing shell of the cable organizer removed.

The channels 382 extend between and are accessed through the first and second receiving edges 366, 368. In certain embodiments, each of the channels 382 is sized and shaped to receive a single cable 334. The channels 382 are coplanar and extend parallel to one another between the first and second receiving edges 366, 368. For example, as shown in FIG. 9, the channels 382 coincide with an organizer plane 385. As shown in FIG. 9, the organizer plane 385 intersects the second housing shell 354 and the cables 334. The organizer plane 385 may bisect the cable organizer 350 and extend parallel to the first broad side 362 (FIG. 8) and the second broad side 364.

Returning to FIG. 8, the cable organizer 350 has a height or thickness 374 that is defined between the first and second broad sides 362, 364, a length (or first dimension) 376 that is defined between the first and second receiving edges 366, 368, and a width (or second dimension) 378 that is defined between the opposite longitudinal edges 370, 372. The cable organizer 350 may have a low profile such that the height 374 is significantly less than the length 376 and/or is significantly less than the width 378. For example, the length 376 may be at least three times (3×) the height 374. In more particular embodiments, the length 376 may be at least four times (4×) the height 374. The width 378 may be at least five times (5×) the height 374. In more particular embodiments, the width 378 may be at least six times (6×) or at least seven times (7×) the height 374. By way of illustration only, the height 374 may be about 2.5 millimeters (mm) to about 4 mm, the length 376 may be about 10 mm to about 15 mm, and the width 378 may be about 20 mm to about 30 mm. It should be understood, however, that embodiments may have other dimensions.

In some embodiments, the cable organizer 350 may have a low profile such that the height 374 is about equal to or less than three times (3×) a largest cross-sectional dimension 380 of the cable 334. By way of example, the largest cross-sectional dimension 380 may be about 1 mm to about 2 mm. In particular embodiments, the cable organizer 350 may have a low profile such that the height 374 is about equal to or less than three times (3×) or is about equal to or less than two times (2×) the largest cross-sectional dimension 380. The largest cross-sectional dimension 380 may be a diameter of the cable 334. By way of one example, the height 374 may be 3.2 millimeters (mm) and the largest cross-sectional dimension 380 of the cable 334 may be 1.2 mm. By way of example, the length 376 may be at least one centimeter and the width 378 may be at least two centimeters. Again, it should be understood that embodiments may have other dimensions.

In FIG. 9, the first housing shell 352 (FIG. 8) has been removed to illustrate the channels 382 in greater detail. The second housing shell 354 may include channel walls 384 that define the channels 382. In the illustrated embodiment, the channel walls 384 do not extend entirely between the first and second receiving edges 366, 368. As shown, the channel walls 384 are positioned along the first receiving edge 366 and along the second receiving edge 368. The channel walls 384 have a thickness that defines a wall gap 388 between adjacent channels 382. The wall gaps 388 between the channels 382 may be substantially equal such that the cables 334 of the cable array 335 are spaced apart from each other in a uniform manner as the cables 334 extend through the cable organizer 350 (FIG. 8). In particular embodiments, the wall gaps 388 are essentially equal to the cable gaps 325 (FIG. 6) that extend between the cables 334 along the loading edge 307 (FIG. 6) of the contact module 301B (FIG. 4). Accordingly, in some embodiments, the cable organizer 350 may hold the cables 334 at the same relative positions as the cables 334 are held by the contact module 301A and/or by the contact module 301B.

The channel walls 384 along the first receiving edge 366 are aligned with the channel walls 384 along the second receiving edge 368 so that the cables 334 extend parallel to one another as the cables 334 extend through the cable organizer 350. Adjacent channel walls 384 are separated from each other by a channel width 390, and the channels 382 have a channel height 392 that is measured between the first housing shell 352 and the second housing shell 354. The channel width 390 and the channel height 392 may be dimensioned such that each channel 382 may receive only a single corresponding cable 334.

In some embodiments, the channel width 390 and/or the channel height 392 is about equal to or slightly greater than the largest cross-sectional dimension 380 of the cable 334. In such embodiments, the first housing shell 352 (FIG. 8) and/or the second housing shell 354 may engage the corresponding cable 334 within the corresponding channel 382 and generate frictional forces. For example, frictional forces generated between the channel walls 384 and the cable 334 may facilitate holding the cable organizer 350 (FIG. 8) at a designated position along a length of the ribbon assembly 300. In some embodiments, the frictional forces may hold the cable organizer 350 at a designated position, but permit a user to slide the cable organizer 350 in either direction along the length of the ribbon assembly 300 using a positioning force 395 (shown in FIG. 8). For example, the user may grip the cable organizer 350 and a portion of the cable array 335 proximate to the cable organizer 350 and pull or push the cable organizer 350 along the cables 334. In some embodiments. the frictional forces may be so great that the cable organizer 350 is not readily slidable along the length of the ribbon assembly 300. To re-position the cable organizer 350, the first and second housing shells 352, 354 may be uncoupled and removed from the ribbon assembly 300. The cable organizer 350 may be positioned at a different location along the length of the ribbon assembly 300 by coupling the first and second housing shells 352, 354 to each other at the different location.

Optionally, the first housing shell 352 (FIG. 8) and the second housing shell 354 may couple to each other through a frictional engagement (e.g., interference fit). For instance, the first housing shell 352 may include posts or projections (not shown) that are received by coupling cavities 396 that extend into corner bases 398 of the second housing shell 354. The posts may form a frictional engagement with an interior surface of the corner base 398 that defines the coupling cavity 396. The second housing shell 354 may also include a slot 399 that extends between opposing corner bases 398. The slot 399 may be configured to receive a tab 393 (shown in FIG. 8) of the first housing shell 352 when the first and second housing shells 352, 354 are coupled to each other.

Although the first and second housing shells 352, 354 are coupled to each other by frictional forces in some embodiments, additional methods of coupling the first and second housing shells 352, 354 may be used. For example, an adhesive may be placed along the interface 356 (FIG. 8) to secure the first and second housing shells 352, 354 to each other. In alternative embodiments, fastening mechanisms or hardware may be used. For example, at least one of the first and second housing shells 352, 354 may form a latch that engages the other housing shell. As another example, the first and second housing shells 352, 354 may be coupled to each other using hardware, such as screws or plugs.

Figure 10:
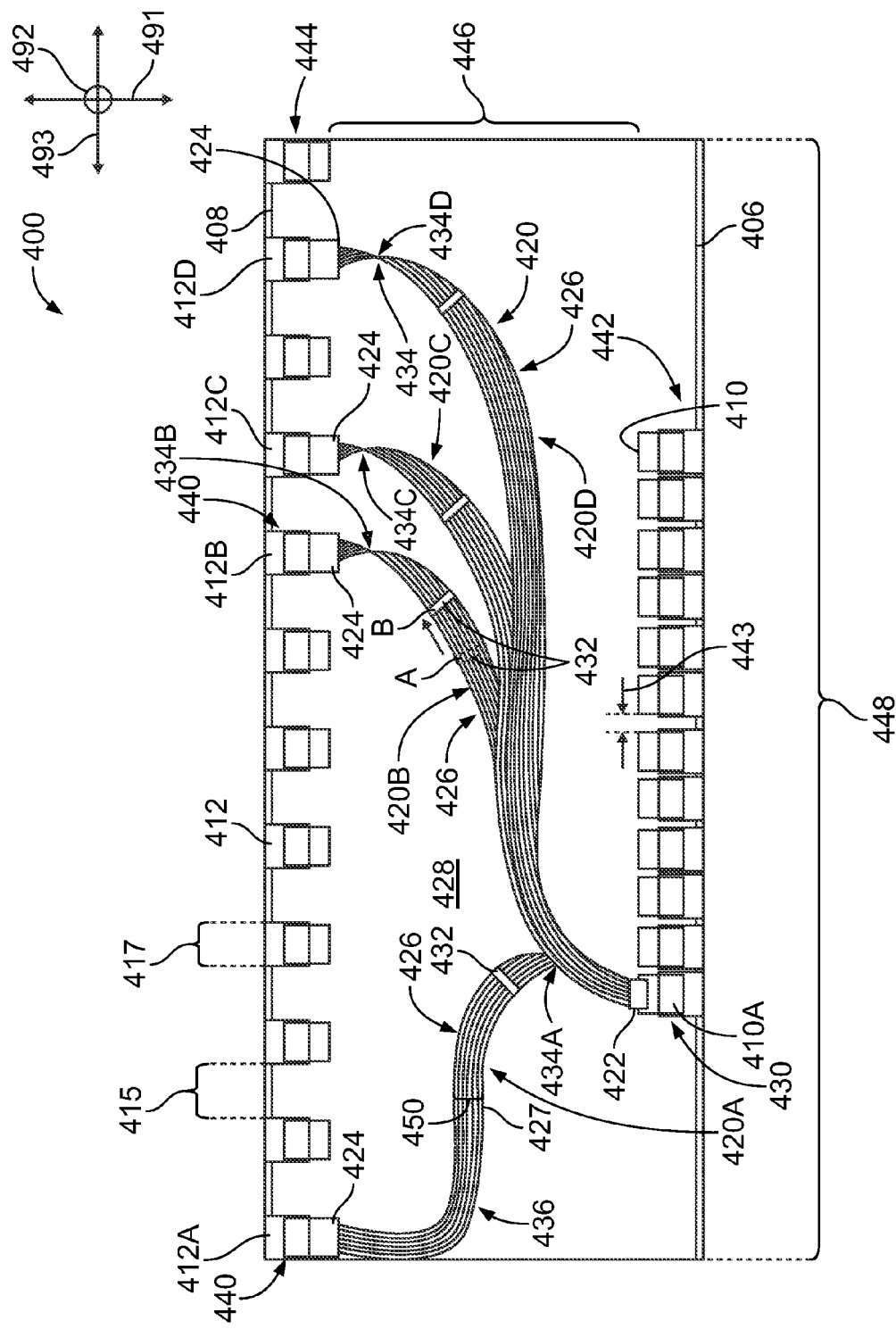
FIG. 10 illustrates a plan view of an incomplete rack system and illustrates how ribbon assemblies that form one electrical connector may also form a portion of multiple other electrical connectors.

FIG. 10 illustrates a plan view of an incomplete rack system 400 during assembly of the rack system 400. The rack system 400 may be similar to the rack system 150 (FIG. 2). The rack system 400 is oriented with respect to mutually perpendicular axes, including a mating axis 491, a first lateral axis 492, and a second lateral axis 493. As shown, a support panel 404 is oriented such that the support panel 404 extends parallel to a plane defined by the mating axis 491 and the second lateral axis 493. The support panel 404 includes first and second panel edges 406, 408 that extend parallel to the second lateral axis 493. The rack system 400 also includes a plurality of connector housings 410 that are positioned along the first panel edge 406 and a plurality of connector housings 412 that are positioned along the second panel edge 408.

Each connector housing 410 may have a position or address along the first panel edge 406, and each connector housing 412 may have a position or address along the second panel edge 408. In the illustrated embodiment, the connector housings 410 are stacked along the first panel edge 406 such that adjacent connector housings 410 engage or interface with each other. In FIG. 10, one connector gap 413 exists between two of the connector housings 410. The connector housings 412, however, are distributed along the second panel edge 408 such that adjacent connector housings 412 are spaced apart from each other by a connector gap 415. The connector gap 415 is the same for each pair of adjacent connector housings 412 in FIG. 10. In other embodiments, however, the connector gap 415 may vary depending upon the desired application. In the illustrated embodiment, the connector gap 415 is about equal to or greater than a height 417 of the connector housing 412, but the connector gap 415 may have other dimensions.

The rack system 400 may include a plurality of ribbon assemblies 420. For example. only four ribbon assemblies 420A, 420B, 420C, 420D have been positioned relative to the support panel 404. In FIG. 10, the force of gravity is into the page along the first lateral axis 492 such that the ribbon assemblies 420A-420D are resting upon the support panel 404. The ribbon assemblies 420A-420D may be similar or identical to the ribbon assemblies 300. For example, each ribbon assembly 420A-420D may include a first contact module 422, a second contact module 424, and a cable array 426 that extends between and mechanically and electrically couples the first and second contact modules 422, 424. In the illustrated embodiment, each ribbon assembly 420 includes eight cables 427, which may be similar or identical to the cables 164 (FIG. 2) or the cables 334 (FIG. 6). The cable array 426 has a lateral dimension or width 450 that is measured transverse to the length of the cable array 426 between the outer surfaces of the two outermost cables 427.

As shown in FIG. 10, the first contact modules 422 of the four ribbon assemblies 420A-420D are received within a connector housing 410A. The contact modules 422 may be similar or identical to the contact modules 216 (FIG. 3) or the contact modules 301A, 301B (FIG. 6). The contact modules 422 may be positioned side-by-side to form a dense contact array (not shown) that is presented to an exterior of the rack system 400 for mating with a corresponding mating connector (not shown). The connector housing 410A and the four first contact modules 422 may form an electrical connector 430. In other embodiments, however, the electrical connector 430 is only partially formed in FIG. 10. For example, the connector housing 410A may be configured to receive additional first contact modules 422. In alternative embodiments, the electrical connector 430 may include less than four first contact modules 422.

The second contact modules 424 of the ribbon assemblies 420A-420D are received within different connector housings 412A, 412B, 412C, 412D. More specifically, the second contact modules 424 are received within connector housings 412A, 412B, 412C, and 412D such that each second contact module 424 becomes part of a different electrical connector 440. The electrical connector 440 is not fully assembled in FIG. 10. When the rack system 400 is fully constructed, the electrical connectors 430 may form a connector stack 442 along the first panel edge 406 and the electrical connectors 440 may form a connector stack 444 along the second panel edge 408.

The cable arrays 426 and corresponding cables 427 extend across a cabling cavity 428 that exists between the electrical connectors 430 and the electrical connectors 440. The cabling cavity 428 represents a space in which the cable arrays 426 extend through to communicatively couple the different electrical connectors. The cabling cavity 428 is defined between the connector stack 442, the connector stack 444, the support panel 404, and a support panel (not shown) that is positioned over the ribbon assemblies 420 and the electrical connectors 430, 440 to form the rack system 400. Accordingly, the ribbon assemblies 420 may be routed such that each electrical connector 430 may be communicatively coupled to a plurality of different electrical connectors 440, and each electrical connector 440 may be communicatively coupled to a plurality of different electrical connectors 430. Consequently, the ribbon assemblies 420 may overlap with one another within the cabling cavity 428.

A depth 446 of the cabling cavity 428 may be measured along the mating axis 491, a width (not shown) of the cabling cavity 428 may be measured along the first lateral axis 492, and a height 448 of the cabling cavity 428 may be measured along the second lateral axis 493. The height 448 of the cabling cavity 428 is defined by the larger of the connector stacks, which is the connector stack 444 in the illustrated embodiment. As described above with respect to the cabling cavity 184 (FIG. 2), available space within the cabling cavity 428 is relatively limited. For example, the ribbon assemblies 420 (or cable arrays 426 or cables 427) overlap one another and, as a group, are compressed within the cabling cavity 428 by the support panel 404 and the opposing support panel. When compressed, the ribbon assemblies 420 (or the cable arrays 426 or the cables 427) engage one another within the cabling cavity 428. In some embodiments, the cables 427 may engage one another within the cabling cavity 428 to facilitate holding the cables 427 at designated positions with respect to one another.

To facilitate routing the ribbon assemblies 420, each of the ribbon assemblies 420A-420D may include a cable organizer 432. The cable organizer 432 may be similar or identical to the cable organizer 350 (FIG. 8) and may facilitate controlling or locating the cables 427 within the cabling cavity 428. For some applications, one or more of the ribbon assemblies 420 may twist or flip such that the orientations of the first and second contact modules 422, 424 are not the same. For example, in FIG. 10, each of the second contact modules 424 has been flipped or, more specifically, rotated approximately 180° about an axis that extends parallel to the mating axis 491. When the second contact modules 424 are flipped or rotated as shown in FIG. 10, the ribbon assemblies 420A-420D form corresponding twists 434A, 434B, 434C, 434D. As shown, each of the twists 434A-434D is formed about halfway between the corresponding cable organizer 432 and the closest electrical connector.

When a ribbon assembly 420 is twisted, the orientation of the lateral dimension 450 of the ribbon assembly 420 is also rotated. For example, the ribbon assembly 420A includes a flat portion 436 that extends between the cable organizer 432 and the second contact module 424. The lateral dimension 450 of the flat portion 436 extends parallel to the support panel 404 (or parallel to the plane defined by the mating axis 491 and the second lateral axis 493). Along the flat portion 436, the space occupied by the ribbon assembly 420A along the width of the cabling cavity 428, such as the width 185 (FIG. 2), is minimized. At the twist 434A, however, the space occupied by the ribbon assembly 420A along the width of the cabling cavity 428 is maximized. In such instances, it may be difficult to overlap two or more ribbon assemblies 420 at a designated point in the cabling cavity 428 when at least one of the ribbon assemblies 420 has a twist 434 at or near the designated point.

Accordingly, it may be difficult to route each of the ribbon assemblies 420 through the cabling cavity 428 due to the limited amount of space within the cabling cavity 428. For embodiments in which the ribbon assemblies 420 must be twisted, the cable organizers 432 may be used to control where the twists 434 occur within the cabling cavity 428. For instance, as the ribbon assemblies 420 are added to the rack system 400, the ribbon assemblies 420 may tend to overlap each other within a middle portion of the cabling cavity 428. This middle portion may be referred to as a dense region, such as the dense region 512 shown in FIG. 11. It may be desirable to move any twists 434 away from the dense region so that the dense region only includes the flat portions 436 of the ribbon assemblies 420.

By way of example, the twist 434B is located between a corresponding cable organizer 432 and a partially formed electrical connector 440. As the cable organizer 432 is moved closer to the connector stack 444 from point A to point B, the twist 434B may be moved closer to the connector stack 444. More specifically, the portion of the ribbon assembly 420B between the cable organizer 432 and the electrical connector 440 has a helical structure with the single twist 434B. As the cable organizer 432 is moved closer to the connector stack 444 from point A to point B, the helical structure may tighten such that the twist 434B is moved closer to the electrical connector 440. Accordingly, the twists 434 may be generally located within designated portions of the cabling cavity 428.

Each of the cable arrays 426 has a ribbon length that is measured between the corresponding electrical connector 430 and the corresponding electrical connector 440. The ribbon length may be the length of each cable 427 that extends between the contact modules 422, 424. Each cable 427 of the cable array 426 has the same length. In some embodiments, at least some of the cable organizers 432 are located within one-third of the ribbon length from either of the electrical connectors 430, 440. For example, the cable organizer 432 of the ribbon assembly 420A is located within one-third of the ribbon length from the electrical connector 430. The cable organizers 432 of the ribbon assemblies 420B-420D are located within one-third of the corresponding ribbon lengths from the corresponding electrical connectors 440. By way of example, a ribbon length may be at least 10 cm and less than 500 cm. In more particular embodiments, the ribbon length is at least 15 cm and less than 400 cm. In more particular embodiments, the ribbon length is at least 18 cm and less than 100 cm. In more particular embodiments, the ribbon length may be between about 20 cm and 80 cm. In some embodiments, the cable arrays 426 may have different ribbon lengths. For example, a first cable array 426 may have a ribbon length of 25 cm, and a second cable array 426 may have a ribbon length of 40 cm.

As shown, the twist 434A is located closer to the connector stack 442, and the twists 434B, 434C, and 434D are located closer to the connector stack 444. In some embodiments, it may be easier to route ribbon assemblies if the twists of the ribbon assemblies are located closer to the connector stack that has the larger connector-to-connector spacing or pitch. For example, a majority of the twists 434 may be located closer to the connector stack 444. Accordingly, the twists 434 may be localized within designated portions of the cabling cavity 438, which may enable constructing a rack system 400 that accommodates numerous electrical connectors 430, 440 and the associated cables 427.

Figure 11:
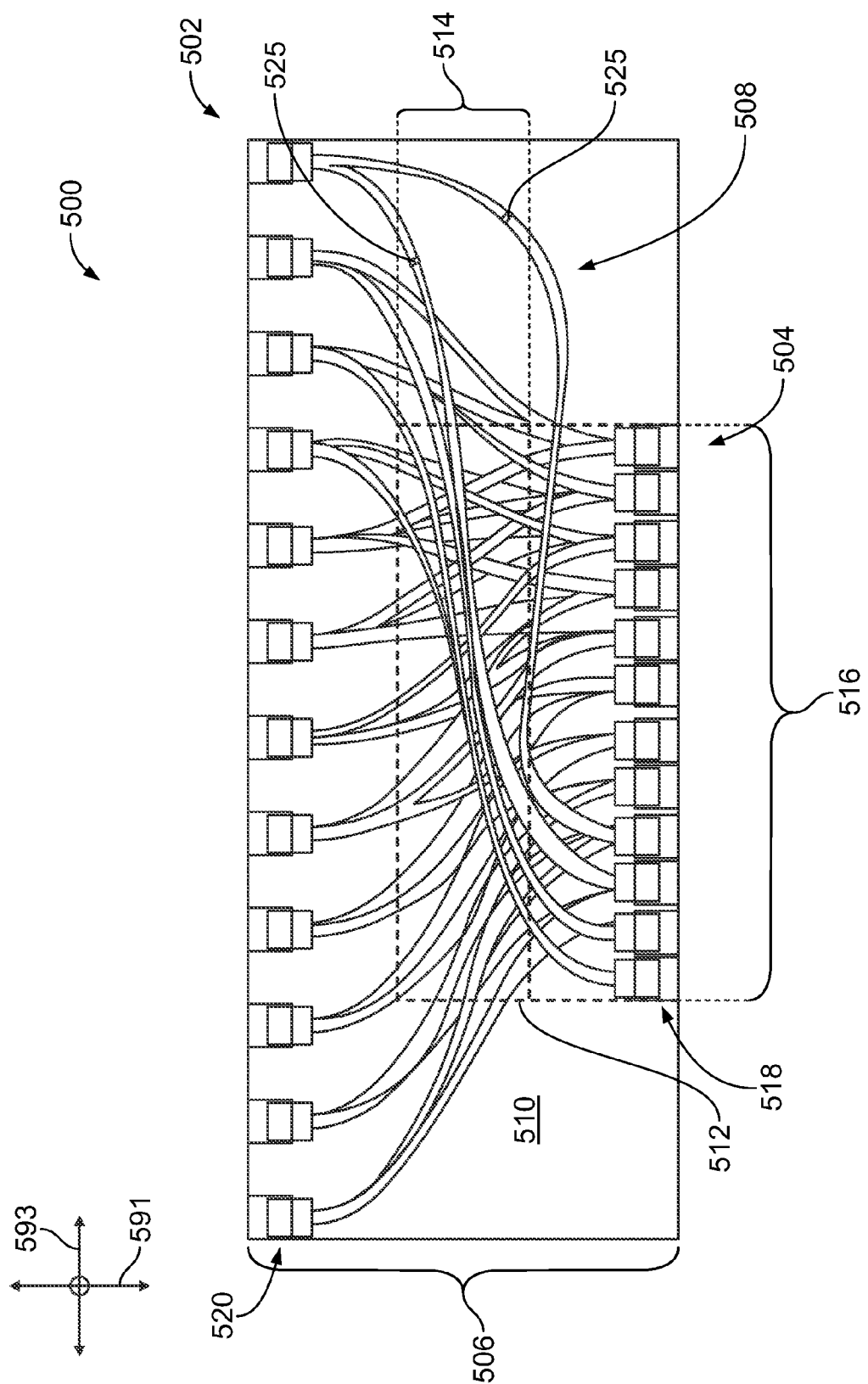
FIG. 11 illustrates a plan view of an incomplete rack system after the electrical connectors of one layer have been assembled from numerous ribbon assemblies.

FIG. 11 illustrates a plan view of a portion of a rack system 500 after electrical connectors 502, 504 of one connector layer 506 have been constructed through multiple ribbon assemblies 508. The rack system 500 may be constructed in a similar manner as described above with respect to the rack system 150 (FIG. 2) and the rack system 400 (FIG. 10). The ribbon assemblies 508 extend through a cabling cavity 510 of the rack system 500. In some embodiments, the number of ribbon assemblies 508 may occupy a significant amount of space within the cabling cavity 510. For example, in FIG. 11 each electrical connector 502, 504 is formed from the corresponding contact modules of four ribbon assemblies 508. The ribbon assemblies 508 communicatively couple twelve electrical connectors 502 and twelve electrical connectors 504. Accordingly, forty-eight (48) ribbon assemblies 508 extend through the cabling cavity 510. In some embodiments, the ribbon assemblies may be twist-free. In other embodiments, at least some of the ribbon assemblies 508 include at least one twist, such as the twists 434 (FIG. 10). Yet in other embodiments, each of the ribbon assemblies 508 includes at least one twist.

As indicated by the dashed box in FIG. 11, the cabling cavity 510 may include a dense region 512 that is positioned approximately in a middle portion of the cabling cavity 510. The dense region 512 may be defined by a middle one-third 514 of the cabling cavity 510, which is measured along a mating axis 591, and a height 516 of a connector stack 518 that includes the electrical connectors 504. The height 516 is measured along a lateral axis 593. The connector stack 518 is smaller than an opposing connector stack 520 that includes the electrical connectors 502. Each of the ribbon assemblies 508 extends through a portion of the dense region 512. In some embodiments, at least some of the ribbon assemblies 508 include one or more cable organizers 525 that enable positioning the ribbon assemblies 508 so that the cabling cavity 510 may hold a designated number of ribbon assemblies 508 within a confined space. In some embodiments, the cable organizer 525 may enable positioning the ribbon assemblies 508 to locate twists away from the dense region 512. For example, the twists may be located closer to the connector stack 520. The electrical connectors 502 of the connector stack 520 are positioned farther apart than the electrical connectors 504 of the connector stack 518. By positioning the twists closer to the connector stack 520, the twists may he more readily positioned within the cabling cavity 510.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The patentable scope should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112(f), unless and until such claim limitations expressly use the phrase "means for" followed by a statement of function void of further structure.

What is claimed is:

1. A communication system comprising:
   first and second support panels extending parallel to each other and having a cabling cavity therebetween;
   a plurality of electrical connectors positioned between the first and second support panels within the cabling cavity, the plurality of electrical connectors having front ends that face an exterior of the communication system for engaging respective mating connectors, the plurality of electrical connectors forming at least one connector stack in which the plurality of electrical connectors are aligned along a lateral axis and the front ends face in a common direction that is perpendicular to the lateral axis, wherein the back ends of the at least one connector stack and the first and second support panels define the cabling cavity therebetween; and
   a plurality of ribbon assemblies interconnecting the plurality of electrical connectors of the at least one connector stack, each of the ribbon assemblies including a plurality of cables that extend through the cabling cavity and interconnect a first electrical connector and a second electrical connector of the plurality of electrical connectors, the cables of each ribbon assembly extending parallel to one another and being coplanar at the first electrical connector and at the second electrical connector, wherein each of a corresponding ribbon assembly of the plurality of ribbon assemblies includes a cable organizer that couples to the cables of the corresponding ribbon assembly, the cables extending parallel to one another and being coplanar as the cables extend through the cable organizer, wherein at least some of the ribbon assemblies overlap one another within a region of the cabling cavity, the first and second support panels compressing the ribbon assemblies therebetween at the region;
   wherein each of the corresponding ribbon assembly has a ribbon length that is measured between the first and second electrical connectors, at least some of the cable organizers being located within one-third of the ribbon length from the first electrical connector such that the twist of the corresponding ribbon assembly is located between the cable organizer and the corresponding first electrical connector;
   wherein the cables of the ribbon assemblies overlap one another and, as a group, are compressed within the cabling cavity by the first and second support panels, the cables engaging one another within the cabling cavity to facilitate holding the cables at designated positions with respect to one another.

2. The communication system of claim 1, wherein each cable includes at least one drain wire and only one pair of signal conductors.

3. The communication system of claim 1, wherein the cable organizer for each of the corresponding ribbon assembly of the plurality of ribbon assemblies includes first and second housing shells that are coupled to each other along an interface and form a first receiving edge and a second receiving edge that face in opposite directions, the cable organizer also including a plurality of channels that are formed between the first and second housing shells, the channels extending between and being accessed through the first and second receiving edges, each channel being sized and shaped to receive a single cable having at least one drain wire and only one pair of signal conductors.

4. The communication system of claim 1, wherein the cables are spaced apart from each other in a uniform manner as the cables extend through the cable organizer.

5. The communication system of claim 1, wherein each of the electrical connectors includes a high-density contact array of the signal contacts having at least 12 signal contacts per 100 mm$^2$ along a front end of the corresponding electrical connector.

6. The communication system of claim 1, wherein the cables have a common length measured between the first and second electrical connectors that is at least 18 centimeters.

7. The communication system of claim 1, wherein the cable organizer for each of the corresponding ribbon assembly of the plurality of ribbon assemblies includes a plurality of channels, each of the channels receiving a single cable.

8. The communication system of claim 7, wherein the channels of each cable organizer are sized and shaped to permit the cable organizer to slide along the plurality of cables of the corresponding ribbon assembly when a positioning force is applied.

9. The communication system of claim 1, wherein a majority of twists formed by the cables of the plurality of ribbon assemblies are located away from a dense region of the cabling cavity.

10. The communication system of claim 1, wherein the cabling cavity is sized and shaped to accommodate only one connector layer of the electrical connectors.

11. The communication system of claim 1, wherein the cabling cavity is a first cabling cavity, the communication system further comprising:
a third support panel, the third support panel and the second support panel forming a second cabling cavity therebetween, the second support panel separating and defining the first and second cabling cavities;
a plurality of electrical connectors forming a third connector stack and a fourth connector stack, the front ends of the electrical connectors of the third connector stack and the front ends of the electrical connectors of the fourth connector stack facing in opposite directions, the back ends of the third and fourth connector stacks and the second and third support panels defining the second cabling cavity therebetween, the third and second support panels extending from the third connector stack to the fourth connector stack, each of the second and third support panels engaging the electrical connectors of the third connector stack and the electrical connectors of the fourth connector stack; and a plurality of ribbon assemblies that overlap one another within a region of the second cabling cavity, the third and fourth support panels compressing the ribbon assemblies therebetween at the region of the second cabling cavity.

12. The communication system of claim 1, wherein the cable organizer for each of the ribbon assemblies of the plurality of ribbon assemblies is a low profile cable organizer in which a thickness of the cable organizer is about equal to or less than three times (3×) a diameter of the cables.

13. A communication system comprising: first and second support panels extending parallel to each other and having a cabling cavity therebetween; a plurality of electrical connectors positioned between the first and second support panels within the cabling cavity, the electrical connectors having front ends that face an exterior of the communication system for engaging respective mating connectors, the electrical connectors forming at least one connector stack in which the electrical connectors are aligned along a lateral axis and the front ends face in a common direction that is perpendicular to the lateral axis, wherein the back ends of the at least one connector stack and the first and second support panels define the cabling cavity therebetween; and a plurality of ribbon assemblies interconnecting the electrical connectors of the at least one connector stack, each of the ribbon assemblies including a plurality of cables that extend through the cabling cavity and interconnect a first electrical connector and a second electrical connector of the plurality of electrical connectors, the cables of each ribbon assembly extending parallel to one another and being coplanar at the first electrical connector and at the second electrical connector, wherein each corresponding ribbon assembly of the plurality of ribbon assemblies includes a cable organizer that couples to the cables of the corresponding ribbon assembly, the cables extending parallel to one another and being coplanar as the cables extend through the cable organizer; wherein each of the ribbon assemblies includes first and second contact modules, the first contact module forming part corresponding to the first electrical connector and the second contact module forming part corresponding to the second electrical connector, wherein the first and second contact modules are positioned such that a twist of the plurality of cables exists within the cabling cavity; and wherein each of the plurality of ribbon assemblies has a ribbon length that is measured between the first and second electrical connectors, at least some of the cable organizers being located within one-third of the ribbon length from the first electrical connector such that the twist of the corresponding ribbon assembly is located between the cable organizer and the first electrical connector; wherein the cables of the plurality of ribbon assemblies overlap one another and, as a group, are compressed within the cabling cavity by the first and second support panels, the cables engaging one another within the cabling cavity to facilitate holding the cables at designated positions with respect to one another.

14. The communication system of claim 13, wherein the cable organizer for each of the corresponding ribbon assembly of the plurality of ribbon assemblies includes a plurality of channels that extend parallel to one another, each of the channels receiving a single cable of the plurality of cables.

15. The communication system of claim 14, wherein the channels are sized and shaped to permit the cable organizer to slide along the plurality of cables when a positioning force is applied.

16. The communication system of claim 13, wherein the cable organizer for each of the ribbon assemblies of the plurality of ribbon assemblies is a low profile cable organizer in which a thickness of the cable organizer is about equal to or less than three times (3×) a diameter of the cables.

17. A communication system comprising: first and second support panels extending parallel to each other and having a cabling cavity therebetween; a plurality of electrical connectors positioned between the first and second support panels within the cabling cavity, the plurality of electrical connectors having front ends that face an exterior of the communication system for engaging respective mating connectors, the plurality of electrical connectors forming a plurality of connector stacks in which the plurality of electrical connectors are aligned along a lateral axis and the front ends face in a common direction that is perpendicular to the lateral axis, wherein the back ends of at least one of the plurality of connector stacks and the first and second support panels define the cabling cavity therebetween; and a plurality of ribbon assemblies interconnecting the electrical connectors of the at least one of the plurality of connector stacks, each of the ribbon assemblies including a plurality of cables that extend through the cabling cavity and interconnect a first electrical connector and a second electrical connector of the plurality of electrical connectors, the cables of each ribbon assembly extending parallel to one another and being coplanar at the first electrical connector and at the second electrical connector, wherein each corresponding ribbon assembly of the plurality of ribbon assemblies includes a cable organizer that couples to the cables of the corresponding ribbon assembly, the cables extending parallel to one another and being coplanar as the cables extend through the cable organizer, wherein at least some of the plurality of ribbon assemblies overlap one another within a region of the cabling cavity, the first and second support panels compressing the plurality of ribbon assemblies therebetween at the region;

wherein the at least one of the plurality of connector stacks includes a first connector stack and a second connector stack, the front ends of the electrical connectors of the first connector stack and the front ends of the electrical connectors of the second connector stack facing in opposite directions, the back ends of the first and second connector stacks and the first and second support panels defining the cabling cavity therebetween, the first and second support panels extending from the first connector stack to the second connector stack, each of the first and second support panels engaging the electrical connectors of the first connector stack and the electrical connectors of the second connector stack.

18. The communication system of claim 17, wherein each of the first and second connectors stacks includes at least seven electrical connectors.

19. The communication system of claim 17, wherein each of the ribbon assemblies has a ribbon length that is measured between the first and second electrical connectors, at least some of the cable organizers being located within one-third of the ribbon length from the corresponding first electrical connector such that a twist of the corresponding ribbon assembly is located between the corresponding cable organizer and the corresponding first electrical connector.

20. The communication system of claim 17, wherein the cable organizer for each of the ribbon assemblies of the plurality of ribbon assemblies is a low profile cable organizer in which a thickness of the cable organizer is about equal to or less than three times (3×) a diameter of the cables.

* * * * *